Aug. 16, 1966　　　E. H. SAHAGIAN　　　3,266,547
WHEEL ACCESSORY AND TIRE CHAIN ATTACHING DEVICE
Filed Feb. 10, 1965　　　2 Sheets-Sheet 1
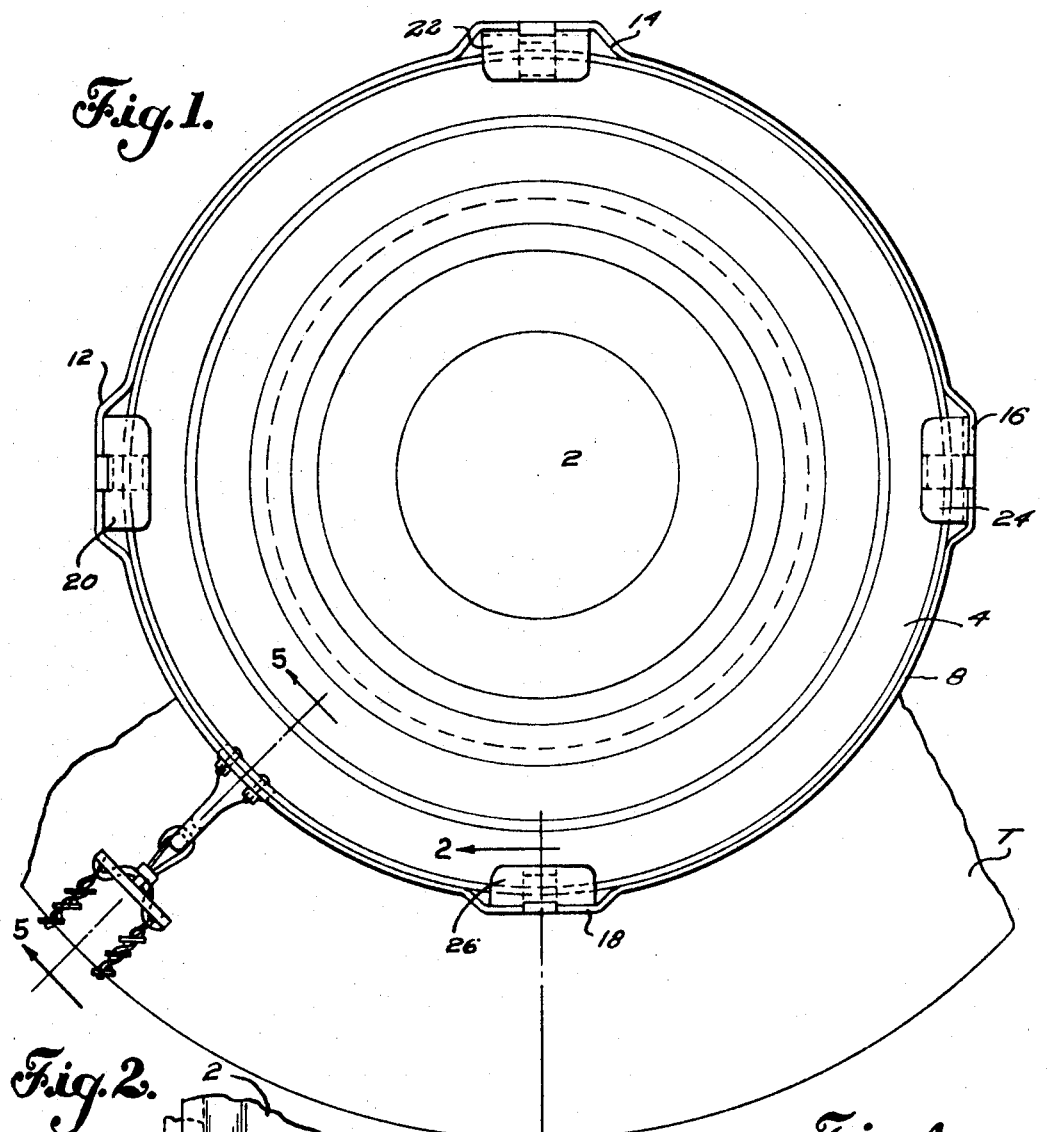
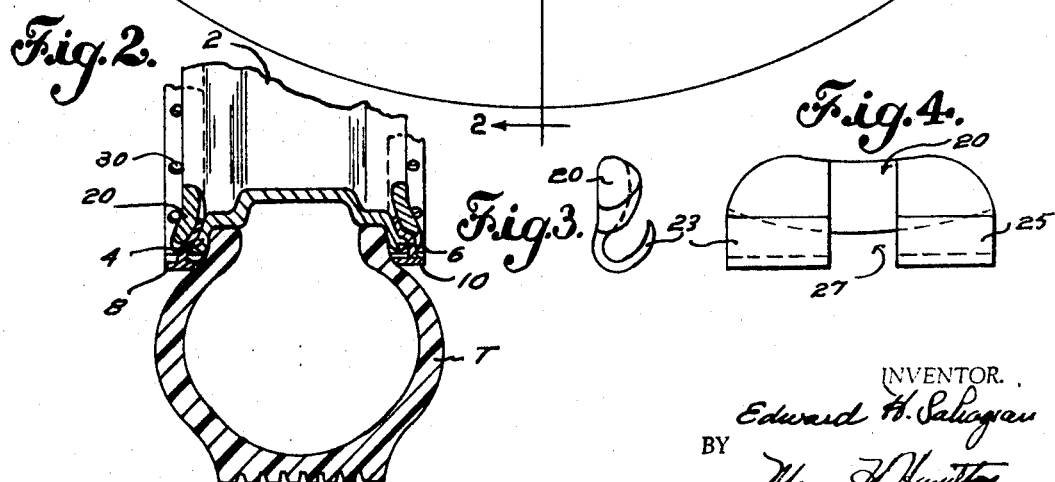
INVENTOR.
Edward H. Sahagian
BY Aug. 16, 1966 E. H. SAHAGIAN 3,266,547
WHEEL ACCESSORY AND TIRE CHAIN ATTACHING DEVICE
Filed Feb. 10, 1965 2 Sheets-Sheet 2
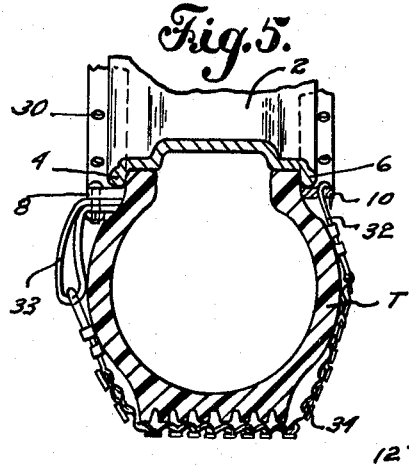
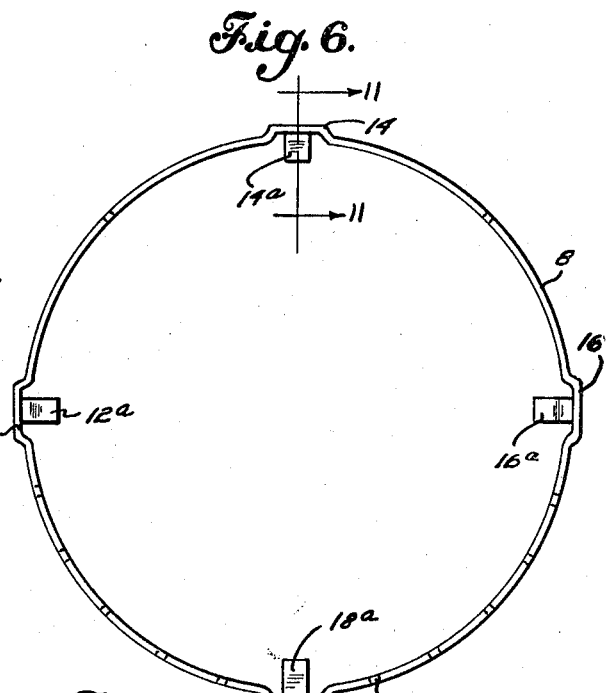
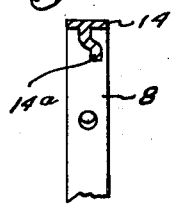
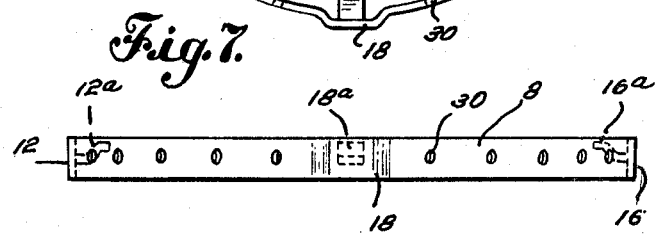
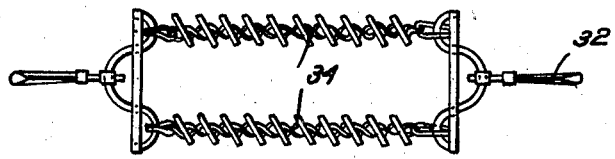
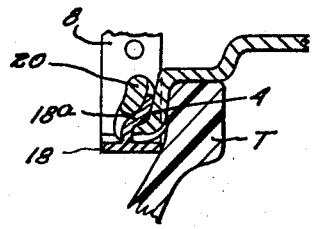
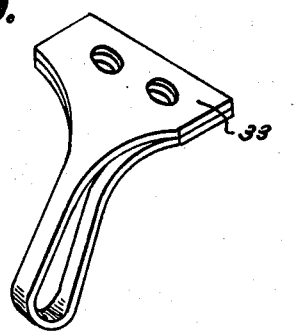
INVENTOR.
Edward H. Sahagian
BY

United States Patent Office 3,266,547
Patented August 16, 1966

3,266,547
WHEEL ACCESSORY AND TIRE CHAIN
ATTACHING DEVICE
Edward H. Sahagian, 46 Brent St., Dorchester, Mass.
Filed Feb. 10, 1965, Ser. No. 431,657
7 Claims. (Cl. 152—236)

This invention relates to a wheel accessory for a vehicle wheel of the class which includes a metal rim and an inflatable tire mounted therearound. More particularly the invention is concerned with a novel ring and wheel rim assembly which can under some circumstances serve as a protective frame to minimize damage to a tire wall in the event the tire is deflated and which can in other cases be employed to support anti-skid cross links of a tire chain.

It is an object of the invention to provide a wheel accessory which may be used both as a tire anti-skid device and as a tire protective member to keep a deflated tire in place when a sudden blowout occurs.

It is a further object of the invention to provide a safety ring which may be arranged to prevent tire damage by a wheel rim in the event of a tire blow out.

Still another object is to provide an anchoring ring which may be employed to support the tire chain section in a safe and convenient manner and which makes possible a simplified and rapid installation of anti-skid cross links.

The nature of the invention and its other objects and novel features will be more fully understood and appreciated from the following description of a preferred embodiment of the invention selected for purposes of illustration and shown in the accompanying drawings, in which:

FIGURE 1 is an inside elevational view of a vehicle wheel and tire with the special rim and ring arrangement of the invention shown therein;

FIGURE 2 is a cross section taken on the line 2—2 of FIGURE 1;

FIGURE 3 is a detail end view of a clamping lug member of the invention;

FIGURE 4 is another detail elevational view of the tire clamping lug;

FIGURE 5 is a cross section taken on the line 5—5 of FIGURE 1;

FIGURE 6 is an end elevational view of the special ring component separated from the vehicle wheel;

FIGURE 7 is a side elevational view of the ring;

FIGURE 8 is a detail view of an anti-skid cross link arrangement;

FIGURE 9 is a perspective view of a retainer loop used to anchor one end of an anti-skid chain arrangement;

FIGURE 10 is a fragmentary detail view partly in cross section of the ring, rim and clamping lug fully assembled; and FIGURE 11 is a detail fragmentary view of a lug member.

Referring more in detail to the srtucture shown in the drawings, numeral 2 denotes a vehicle wheel which includes inner and outer rim portions 4 and 6 around which is located a tire T.

Mounted around the tire and rim assembly noted are the wheel rings of the invention which includes a pair of rigid ring bodies 8 and 10. The rings are shown installed in FIGURES 1, 2 and 5, and are also shown removed from the wheel 2 in FIGURES 6 and 7. As may be seen from an inspection of FIGURE 1, ring member 8 is formed of a diameter such that it may be placed against the inner peripheral sidewall of the tire T in a position to encircle the respective rim portion 4. Likewise a ring 10 is arranged to assume a similar position on the outer peripheral wall surface of the tire T.

Considering the ring 8 as shown in FIGURE 1, it will be observed that the ring is formed with a series of outwardly expanded portions 12, 14, 16, 18 and projecting radially inwardly from those expanded portions are respective retaining tongues 12a, 14a, 16a and 18a. These retaining portions are reversely bent as shown in FIGURE 11 to lie against and conform to the contour of the outer surface of rim 4. This is further illustrated in FIGURES 2 and 10.

It is pointed out that the retaining tongues are of a width substantially less than the circumferential width of the expanded portions from which they project and thus there is left spaces at either side of the lugs in the expanded portions for receiving special locking means consisting of U-shaped clamping lugs 20, 22, 24 and 26 for ring 8. Similar lugs are provided for ring 10. The clamping lug 20 is shown in FIGURES 3 and 4 removed from the wheel and as will be noted consists of a slotted intermediate leg portion having hooked extremities 23 and 25. The slot 27 of lug 20 thus provides a space through which a retaining tongue may project when the hooked ends as 23 and 25 are located between the tire and adjacent rim surface as suggested in FIGURES 2 and 10.

It will be understood that these locking lugs when thus installed are clamped to the rim at the same time they in turn clamp the retaining tongues against the wheel rim and hence the respective ring members are solidly anchored on the wheel. In installing the locking clamps they are designed to be driven in between the tire and rim in the same way in which balancing lugs are installed in balancing tires and if desired the tire may be partly deflated to facilitate this operation.

It is pointed out that the ring member when thus installed constitutes protective means for serving two purposes. In the first instance the rings function to prevent the tire from becoming thrown off the rim in the event of a blowout since the inner edge of the rings bear against a somewhat larger area of the tire sidewall than is contacted by the rim edges. Secondly, the rings occurring as they do between the rim and the tire constitute protective edges to preventing the edges of the rim from cutting into the tire in the event of a flat tire which is run on for a short distance. The width of the rings is of substantial dimension and thus the cutting action is greatly minimized.

A further desirable feature of the rings is the use as chain link anchoring means and for this purpose the rings are formed with holes 30 occurring in spaced apart intervals and adapted to receive therethrough hooks 32 of cross links as 34.

In utilizing the rings for attaching tire chains, I may also provide on the inner ring 8 a plurality of attaching loops as 33, or I may utilize only the holes in the ring 8. In either case it will be apparent that the hooks 32 may be readily engaged to quickly and conveniently install a plurality of cross links. Likewise the cross links may be just as quickly removed when desired. To facilitate both installation and removal, I may also construct the hooks 32 with springs for allowing the cross links to be stretched into place and resiliently hold the links in place at all times.

While I have illustrated a preferred form of the invention, I may desire to make changes and modifications within the scope of the appended claims.

I claim:
1. A wheel accessory for a vehicle wheel of the class having a rim and an inflatable tire thereon, said accessory comprising endless ring members mounted around the inner and outer sidewalls of the tire in a position to encircle the peripheral portions of the rim, means forming a part of the rings for engaging against adjacent rim surfaces, locking members for said means in clamped relationship with the rim, and said wheel accessory means forming a part of the rings consisting of retainer tongue portions formed to engage against adjacent exposed surfaces of the rim.

2. A wheel accessory according to claim 1 in which the locking means which secures the retainer portions consists of U-shaped clamping lugs having slotted intermediate portions for receiving therethrough the said retaining means.

3. A wheel accessory according to claim 2 in which the slotted intermediate portions are caused to form tapering hook extremities for engaging between the said tire and rim in wedged relationship.

4. A wheel accessory according to claim 3 in which the ring includes antiskid cross link and hook means for detachably securing the cross links in openings formed in the rings at spaced intervals therearound.

5. A wheel accessory for a vehicle wheel of the class having a rim and an inflatable tire thereon, said accessory comprising inner and outer ring members mounted around inner and outer side walls of the tire in a position to encircle peripheral edges of the rim, said ring members being formed with retaining tongues which extend radially inwardly in a reversely curved manner to overlie and conform to the curved surfaces of the rim, locking means consisting of U-shaped clamping lugs, said clamping lugs being formed at one side with slotted intermediate portions which overlie these retaining tongues and extend between the arc and the rim to hold the ring in solidly anchored relationship and chain means detachably secured thereto.

6. A wheel accessory as defined in claim 5 in which the ring members are formed with chain holes and said chain means being formed with hooked portions for engaging in the holes.

7. A wheel accessory as defined in claim 6 in which one of the rings is provided with chain holding loops on which the hooks may be received.

References Cited by the Examiner
UNITED STATES PATENTS

| | | | |
|---|---|---|---|
| 1,423,963 | 7/1922 | O'Neil | 152—233 |
| 2,241,592 | 5/1941 | Goldenberg | 152—233 |

ARTHUR L. LA POINT, *Primary Examiner.*

C. W. HAEFELE, *Assistant Examiner.*